(12) United States Patent
Panzer et al.

(10) Patent No.: US 10,498,797 B2
(45) Date of Patent: *Dec. 3, 2019

(54) SYSTEMS AND METHODS FOR CACHING AND SERVING DYNAMIC CONTENT

(71) Applicant: Oath Inc., Dulles, VA (US)

(72) Inventors: John Panzer, Mountain View, CA (US); Vishwanathan Ramamurthy, Mountain View, CA (US); Mohan Rao, Sunnyvale, CA (US)

(73) Assignee: Oath Inc., Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/042,322

(22) Filed: Jul. 23, 2018

(65) Prior Publication Data

US 2018/0332099 A1 Nov. 15, 2018

Related U.S. Application Data

(63) Continuation of application No. 14/286,935, filed on May 23, 2014, now Pat. No. 10,063,615, which is a
(Continued)

(51) Int. Cl.
*H04L 29/08* (2006.01)
*G06F 16/958* (2019.01)
(Continued)

(52) U.S. Cl.
CPC ............ *H04L 67/02* (2013.01); *G06F 15/167* (2013.01); *G06F 16/9574* (2019.01); *G06F 16/972* (2019.01); *H04L 67/10* (2013.01)

(58) Field of Classification Search
CPC ..... H04L 67/02; H04L 67/10; G06F 16/9574; G06F 16/972; G06F 15/167
See application file for complete search history.

(56) References Cited

U.S. PATENT DOCUMENTS 5,864,854 A 1/1999 Boyle
6,192,398 B1 2/2001 Hunt
(Continued)

OTHER PUBLICATIONS

Fielding, Request for Comments: 2616, Jun. 1999, Network Working Group, section 14.9 Cache-Control (Year: 1999).*

*Primary Examiner* — Wing F Chan
*Assistant Examiner* — Billy H Ng
(74) *Attorney, Agent, or Firm* — Bookoff McAndrews, PLLC

(57) ABSTRACT

A web server and a shared caching server are described for serving dynamic content to users of at least two different types, where the different types of users receive different versions of the dynamic content. A version of the dynamic content includes a validation header, such as an ETag, that stores information indicative of the currency of the dynamic content and information indicative of a user type for which the version of the dynamic content is intended. In response to a user request for the dynamic content, the shared caching server sends a validation request to the web server with the validation header information. The web server determines, based on the user type of the requestor and/or on the currency of the cached dynamic content whether to instruct the shared caching server to send the cached content or to send updated content for serving to the user.

18 Claims, 5 Drawing Sheets

Related U.S. Application Data continuation of application No. 13/747,302, filed on Jan. 22, 2013, now Pat. No. 8,738,691, which is a continuation of application No. 12/058,547, filed on Mar. 28, 2008, now Pat. No. 8,370,424.

(60) Provisional application No. 60/945,799, filed on Jun. 22, 2007.

(51) Int. Cl.
  *G06F 16/957* (2019.01)
  *G06F 15/167* (2006.01)

(56) References Cited

U.S. PATENT DOCUMENTS

| | | |
|---|---|---|
| 6,351,767 B1 | 2/2002 | Batchelder et al. |
| 6,678,793 B1 | 1/2004 | Doyle |
| 6,766,313 B1 | 7/2004 | Kromman |
| 6,785,769 B1 | 8/2004 | Jacobs et al. |
| 7,350,075 B1 | 3/2008 | Eastham |
| 7,437,754 B2 | 10/2008 | Desai et al. |
| 7,509,393 B2 | 3/2009 | Agarwalla et al. |
| 7,610,400 B2 | 10/2009 | L'Heureux et al. |
| 8,065,275 B2 | 11/2011 | Eriksen et al. |
| 8,463,998 B1 | 6/2013 | Scheevel |
| 8,521,815 B2 | 8/2013 | Tiu, Jr. et al. |
| 2002/0010798 A1 | 1/2002 | Ben-Shaul et al. |
| 2002/0078299 A1 | 6/2002 | Chiou et al. |
| 2002/0129123 A1 | 9/2002 | Johnson et al. |
| 2003/0115420 A1 | 6/2003 | Tsirigotis |
| 2003/0177196 A1 | 9/2003 | Bhasin |
| 2003/0191812 A1 | 10/2003 | Agarwalla et al. |
| 2003/0195940 A1 | 10/2003 | Basu et al. |
| 2004/0010562 A1 | 1/2004 | Itonaga |
| 2004/0068579 A1* | 4/2004 | Marmigere ............ H04L 29/06 709/242 |
| 2004/0225848 A1 | 11/2004 | Wall et al. |
| 2004/0243839 A1* | 12/2004 | Bhatia ................. G06F 21/6218 726/4 |
| 2005/0033926 A1 | 2/2005 | Dumont |
| 2005/0210101 A1 | 9/2005 | Janik |
| 2006/0031379 A1 | 2/2006 | Kasriel et al. |
| 2006/0064500 A1 | 3/2006 | Roth et al. |
| 2006/0129809 A1* | 6/2006 | Battagin ............. G06F 21/6209 713/166 |
| 2007/0016650 A1* | 1/2007 | Gilbert ..................... G09B 5/00 709/207 |
| 2008/0154903 A1* | 6/2008 | Crowley ............... H04L 63/104 |
| 2008/0201331 A1 | 8/2008 | Eriksen et al. |
| 2008/0281617 A1 | 11/2008 | Conrad |

\* cited by examiner

SYSTEMS AND METHODS FOR CACHING AND SERVING DYNAMIC CONTENT

PRIORITY CLAIM

This application is a continuation of pending U.S. Nonprovisional Patent Application No. 14/286,935, filed on May 23, 2014, which is a continuation of U.S. Nonprovisional patent application Ser. No. 13/747,302, filed on Jan. 22, 2013, now U.S. Pat. No. 8,738,691, issued on May 27, 2014, which is a continuation of U.S. Nonprovisional patent application Ser. No. 12/058,547, filed on March 28, 2008, now U.S. Patent No. 8,370,424, issued on Feb. 5, 2013, which claims priority to U.S. Provisional Application No. 60/945,799, filed Jun. 22, 2007, which are incorporated herein by reference in their entireties.

FIELD OF THE INVENTION

The disclosure relates to caching systems, and, in particular, to the use of shared caching systems for serving dynamic web content.

BACKGROUND

The benefits of caching systems are well known. Local client-based browser caches may cache for one user and/or for one computer. Shared caching systems may cache content for multiple users, such as multiple web users, and/or multiple computers. For web page servers, shared caching systems may save the server from having to deliver content directly to each client. However, most shared caching systems rely on a time-based caching approach. A time duration is established for how long cached web pages can be relied upon with assurance to be current, and the established time duration is used to determine a time that web pages remain available in cache. For web page or other content servers with content that changes frequently, the benefits of caching may be rather small, as the cached versions of the web pages are expired from cache quickly.

SUMMARY OF THE DISCLOSURE

A web server and a shared caching server are described for serving dynamic content to users of at least two different types, where the different types of users receive different versions of the dynamic content. A version of the dynamic content includes a validation header, such as an ETag, that stores information indicative of the currency of the dynamic content and information indicative of a user type for which the version of the dynamic content is intended. In response to a user request for the dynamic content, the shared caching server sends a validation request to the web server with the validation header information. The web server determines, based on the user type of the requestor and/or on the currency of the cached dynamic content whether to instruct the shared caching server to send the cached content or to send updated content for serving to the user.

An embodiment of a system for providing access to dynamic web content is described. The system includes a shared caching server configured to receive a web page request from a user for access to a web page. The web page request includes information about the requested web page and about the user. The shared caching server includes a repository of cached web pages, including the requested web page. The cached web page includes header information that identifies when the cached web page was last modified. The system further includes an origin server that stores a current version of the web page. The origin server is configured to receive a validation request from the shared caching server for instructions whether to send the cached version of the web page to the user or to send a modified version of the web page to the user. The validation request includes information about the user and about the cached version of the web page. The origin server further includes a requestor identification module configured to determine a user type associated with the request and a validation-header-based decision module. The validation-header-based decision module is configured to receive from the requestor identification module an indication of the user type associated with the request. The validation-header-based decision module is further configured to use the information about the cached version of the web page to determine if the cached version of the web page is the current version of the web page, and to provide an instruction for the shared caching server indicating whether to use the current version of the web page or a modified version of the web page from the origin server.

An embodiment of a method of serving web content is described. The method includes sending a version of a web page with a validation header to a shared caching server for caching. The validation header allows a computerized determination to be made as to whether the version of the web page is a current version of the web page and as to a type of user for which the version of the web page is suitable. The method further includes receiving from the shared caching server, in response to a user request for the web page, a validation request comprising information about a user making the user request and information from the validation header from the cached version of the web page. The method further includes determining, based on the information from the validation header and on the information about the user, whether to send to the shared caching server a response that includes a modified version of the web page with a new validation header or a response that includes an instruction to use the cached version of the web page; and sending the response to the shared caching server.

An embodiment of a method of serving cached web content is described. The method includes caching, in a shared caching server, a version of a first web page that has a version identifier. The method further includes receiving, at the shared caching server, a request from a user to access a current version of the first web page. The user may be from one of two or more different user types, and users of different types receive different versions of the first web page. The method further includes sending a first validation request to an origin server. The first validation request includes information indicative of the version identifier and information about the user. The method further includes receiving, at the shared caching server, a response from the origin server that includes a modified version of the first web page for sending to the user or includes instructions to send the cached version of the first web page to the user. The response is generated by the origin server, based, at least in part, on at least one of the set consisting of: a determination of the user's user type and a determination as to whether the cached version of the first web page in the shared caching server is the current version of the first web page. If a modified version of the first web page is received by the shared caching server from the origin server, the method further includes providing the modified version of the first web page to the user, and if no modified version of the web page is received by the shared caching server, providing the cached version of the first web page to the user.

An embodiment of a computer-readable medium is described. The computer-readable medium stores executable instructions that, when executed by a processor, cause the processor to perform a method for serving web content. The method includes sending a version of a web page with a validation header to a shared caching server for caching. The validation header allows a computerized determination to be made as to whether the version of the web page is a current version of the web page and as to a type of user for which the version of the web page is suitable. The method further includes receiving from the shared caching server, in response to a user request for the web page, a validation request that includes information about a user making the user request and information from the validation header from the cached version of the web page. The method further includes determining, based on the validation header information and on the information about the user, whether to send to the shared caching server a response that includes a modified version of the web page with a new validation header or a response that includes an instruction to use the cached version of the web page; and sending the response to the shared caching server.

An embodiment of a computer-readable medium is described. The computer medium stores executable instructions that, when executed by a processor, cause the processor to perform a method for serving cached web content. The method includes caching, in a shared caching server, a version of a web page that has a version identifier. The method further includes receiving, at the shared caching server, a request from a user to access a current version of the web page. The user may be from one of two or more different user types, and users of different types receive different versions of the web page. The method further includes sending a validation request to an origin server. The validation request includes information indicative of the version identifier and information about the user. The method further includes receiving, at the shared caching server, a response from the origin server that includes a modified version of the web page for sending to the user or includes instructions to send the cached version of the web page to the user. The response is generated by the origin server, based, at least in part, on at least one of the set consisting of: a determination of the user's user type and a determination as to whether the web page in the shared caching server is the current version of the web page. If a modified version of the web page is received by the shared caching server from the origin server, the method further includes providing the modified version of the web page to the user. If no modified version of the web page is received by the shared caching server, the method further includes providing the cached version of the web page to the user.

For purposes of describing the invention, certain aspects, advantages and novel features of various embodiments of the invention have been described herein. Of course, it is to be understood that not necessarily all such aspects, advantages or features will be embodied in any particular embodiment of the invention.

BRIEF DESCRIPTION OF THE DRAWINGS

A general architecture that implements various features of specific embodiments of the invention will now be described with reference to the drawings. The drawings and the associated descriptions are provided to illustrate embodiments of the invention and not to limit the scope of the invention. Throughout the drawings, reference numbers are reused to indicate correspondence between referenced elements. In addition, the first digit of each reference number indicates the figure in which the element first appears.

FIG. 6 is a block diagram depicting one embodiment of a computer server system configured to run software for implementing one or more embodiments of the systems and methods for dynamic serving of content described herein.

DETAILED DESCRIPTION

Overview

Figure 1:
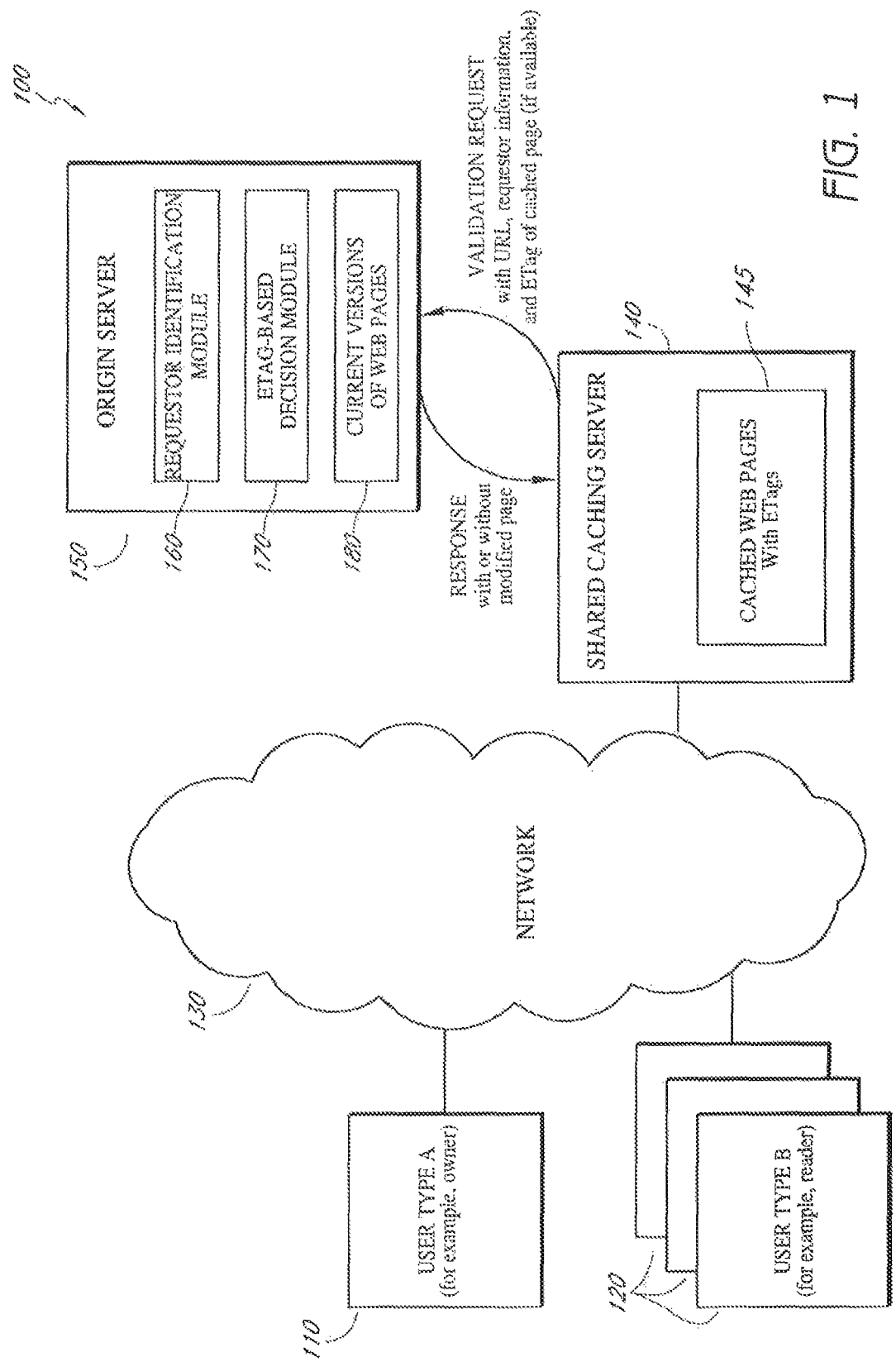
FIG. 1 is a block diagram depicting one embodiment of a system for the dynamic serving of content.

One aspect of embodiments of the invention includes a recognition that, for some dynamic content servers that serve web pages to more than one type of user (for example, a blog), the server may serve substantially the same dynamic content for the vast majority of users (for example, to general readers), but have additional and/or different content for just a few users, such as for one or more user types (for example, the blog owner, or a moderator of a forum). For example, some users may receive additional edit buttons or other controls on their page. Even those few users generally receive most of the same content with only partial changes being made.

Another aspect of embodiments of the invention includes a recognition that web pages that are slightly (or otherwise partially) customized on a per-user-type basis may conventionally be recognized independently based on their differentiation, however slight, and may be independently cached. Using such conventional methods, the cache process may be underutilized due to constraints of the applied approach. Moreover, because many web pages are dynamic and/or partially customized, their viewers and servers are not availed of the benefits of caching under the conventional approach described above, causing a round trip to the origin server on every request and a subsequent recreation of each dynamic page in full.

For example, for a given blog, most of the users receive the normal blog content. However, the blog owner receives slightly different content when he or she accesses the blog because, for instance, he or she may be allowed to delete or edit entries or otherwise modify the blog in a way unavailable to general readers. Similarly, a web forum may provide the same content to a general public of most users, including in some instances, an ability to add comments, but a few users, such as moderators, receive slightly different pages because they have access to tools, not available to normal users, that allow them to perform functions related to moderating (for example, deleting posts). In these situations, it can be wasteful, in terms of system resources, to constantly request the desired content from the dynamic content server for each user request, because most users receive the same content.

For high volume pages, these situations may represent approximately 99% of the web traffic, such that implementation of the systems and methods described herein can result in a reduction of the overall system load by an order of magnitude.

Embodiments of a system are described that utilize, at least in part, the use of Hypertext Transfer Protocol (HTTP) entity tags (ETags), or other appropriately configured revalidation headers (also known as validation headers). ETags are conventionally used to verify whether or not a web page associated with the given ETag has changed. In embodiments of systems and methods disclosed herein, the use of ETags, or other revalidation headers, is extended to further identify user types associated with web pages. ETags advantageously provide an ability to include one or more character strings whose structure and/or interpretation is not dictated by the HTTP protocol, but that can be configured as desired to suit the uses of systems in which they are used. As disclosed herein, the ETags can be used, in conjunction with an identification of requests from various types of users, such as "owner" versus "reader" web page requests, for sending either a "modified" response or "not modified" response, as will be described in greater detail below.

Embodiments of a shared caching system, as described, can cache the content from these types of pages for at least one type of user. For example, the shared caching system may advantageously be used to cache content that is frequently requested and infrequently changed, such as content for blog readers. In some embodiments, content for one or more user types, such as content for blog owners, which may be accessed relatively infrequently, but more often changed when accessed, may not be cached by the shared caching server. Before serving the cached page in response to a user request, the shared caching server can perform a fast check with an origin server (for example, on every request) to see if the current requestor is a type of user that can use the already cached page. More specifically, a check can be performed to identify certain requestors (page owners, moderators, and so forth) who are likely to get different content that differs from the general population. In various embodiments, the origin server can determine the user type quickly through the use of cookies or other information about the user, which may be obtained in conjunction with a user sign-in process. The origin server can serve, to the identified certain requestors, content that is distinguished from the general population by serving the content in a customized form or by redirecting them to different pages altogether. Thus, the same URLs can appear to be fully dynamic to the end user, whether identified as a certain requestor or general population user, even though the URL is actually being cached, and the system can handle a reasonable level of transparent personalization as well.

Embodiments of the systems and methods described herein help to reduce shared caching system loads for web content that is dynamic for only a small portion of the people who view the web content. Furthermore, the systems and methods can reduce the load on a dynamic content server by applying caching that advantageously makes use of existing serving and/or caching infrastructure.

Although the present disclosure describes the systems and methods in terms of embodiments that use the HTTP protocol, and ETags in particular, it is to be understood that in other embodiments, other transfer protocols may additionally or alternatively be used. Furthermore, although the use of ETags provides various benefits, in other embodiments, other forms of control/validation/revalidation headers may be used in performing the methods and systems disclosed herein.

These improvements are more than trivial, as one of the problems with prior systems is an inability to handle problems specific to shared caching systems, such as the issues of partial modifications to web pages, which thwarted application of the conventional caching in a meaningful way. More particularly, local caching requires server delivery to each end user client, whereas a shared caching solution would be positioned upstream, saving the server from having to deliver to each client, even in situations where partial customization exists.

Sample Embodiment

FIG. 1 is a block diagram depicting one embodiment of a system 100 comprising an origin server 150 and a shared caching server 140 that are in communication for providing dynamic content to users 110, 120 of two or more different types. As one example, the dynamic content may be a web log (blog) and the users may include at least one user 110 who is an owner of the blog and one or more users 120 who are readers of the blog. In response to a request to access the blog, the owner 110 may be presented with a version of the blog that is slightly different from the version presented to the readers 120. For example, in addition to content that is presented to the readers 120, the owner 110 may also be presented with edit controls that allow the owner 110 to add blog comments, delete blog comments, or the like.

In other embodiments, other types of users 110, 120 (such as, for example, one or more moderators, administrators, site visitors, or the like) may be served by the system 100. In some embodiments, there may be multiple "owners" 110 for the dynamic content. In some embodiments, with or without an "owner" user type, the system 100 may be configured to differentiate between readers of different types, such as members and non-members of a web-based service, each type receiving content designated for that user type. In some embodiments, more than two different user types may be served by the system 100, wherein users from each user type receive content appropriate for that user type.

Requests from users 110, 120 to access the web content can be made via a network 130, such as the Internet's World Wide Web. In some embodiments, different users 110, 120 may use different networks 130 to access the web content. A request from a user 110, 120 to access a web page is routed via the network 130 to the shared caching server 140, which, as depicted in the embodiment shown in FIG. 1, houses a cache of stored web pages 145. The request may identify a desired Uniform Resource Locator (URL) and may include identifying information about the user 110, 120, in the form of cookies. In some embodiments, more than one shared caching server 140 may be used for accessing and for distributing web content for users 110, 120. In some embodiments, some or all of the cache of stored web pages 145 may be stored internally or externally with respect to the shared caching server 140.

The shared caching server 140 identifies whether a web page has been cached for the requested URL. As will be described with reference to FIGS. 2A and 2B, each cached web page includes an ETag header that can be used to determine whether the cached web page is a most recent version of the web page. As will also be described, the ETag further identifies a type of user for which the stored web page is appropriate.

In response to the user request, the shared caching server 140 sends a validation request to the origin server 150 in order to inquire whether the cached web page from the cache of stored web pages 145 should be served to the requesting user or whether a modified page should be served instead. The validation request includes some or all of the ETag from the identified cached web page, if a cached web page was identified, as well as information about the requested URL and cookie information about the user 110, 120 making the request. In some embodiments, if the shared caching server 140 identifies a cached web page for the requested URL, the associated ETag information may be included in the validation request without additional information about the requested URL.

The origin server 150 includes a store of current versions of web pages 180 for the various types of users. A requestor identification module 160 in the origin server 150 uses the cookie information or other user information to determine what is the user type of the user 110, 120 who is requesting the web page, such as for example using a look-up table or other data structure. The user type information is provided to an ETag-based decision module 170. The ETag-based decision module 170 includes logic for determining whether the identified cached web page from the shared caching server 140 may be server to the user 120 or whether a more current, modified copy of the requested web page 180 is to be forwarded to the shared caching server 140 in response to the user request.

A sample determination is now described using the example depicted in FIG. 1, in which Type A users 110 are web page owners and Type B users 120 are web page readers. The ETag-based decision module 170 can be configured to determine, in response to a request from a reader 120 (Type B), that if the received ETag matches the most recent version of the web page, then the cached web page in the shared caching server 140 can be provided to the reader 120. In this case, the origin server 150 can send a response message to the shared caching server 140, instructing the shared caching server 140 to use the cached web page. If, instead, the ETag-based decision module 170 determines that the received ETag does not match the most recent version of the web page, then an updated version of the web page, with an appropriately updated ETag, can be sent to the shared caching server 140 for providing to the reader 120 and, in some embodiments, for replacing the cached version of the web page in the repository of cached web pages 145.

In the embodiment depicted in FIG. 1, if the user is identified as being an owner 110 (Type A), the ETag-based decision module 170 may be configured to send a new version of the web page to the shared caching server 140, whether the ETag indicates that the cached version is a current version or not. Furthermore, as will be described with reference to FIGS. 2A and 2B below, the shared caching server 140 may be instructed not to cache the owner version of the web page.

In short, in at least one embodiment, as summarized in Table 1 below, the origin server 150 sends a response that indicates that the content from the cache 145 is stale (and should be replaced) if the page is being accessed by the owner 110. However if the page is being accessed by a reader 120, the response depends on whether or not a more current version of the web page exists in the origin server's 150 store of web pages 180.

TABLE 1

Sample Etag-Based Logic

| | PAGE MODIFIED | PAGE NOT MODIFIED |
|---|---|---|
| READER | Send page modified response | Send page not modified response |
| OWNER | Send page modified response | Send page modified response |

As will be understood by one of ordinary skill in the art, in light of the present disclosure, in other embodiments with other user types, the Etag-based decision module 170 may comprise other logic to determine whether to send an current modified version 180 of the requested web page or to instruct the shared caching server 140 to serve the cached page from the repository 145.

Thus, the shared caching server 140 may store current copies of reader web pages, for which requests may arrive relatively frequently over the network and which are changed relatively rarely between requests. In some embodiments, the shared caching server 140 does not store copies of owner web pages, which may be requested relatively rarely and may frequently be changed at each request. Efficient use of the shared caching server 140 is thus enhanced.

Use of Etags

Figure 2A:
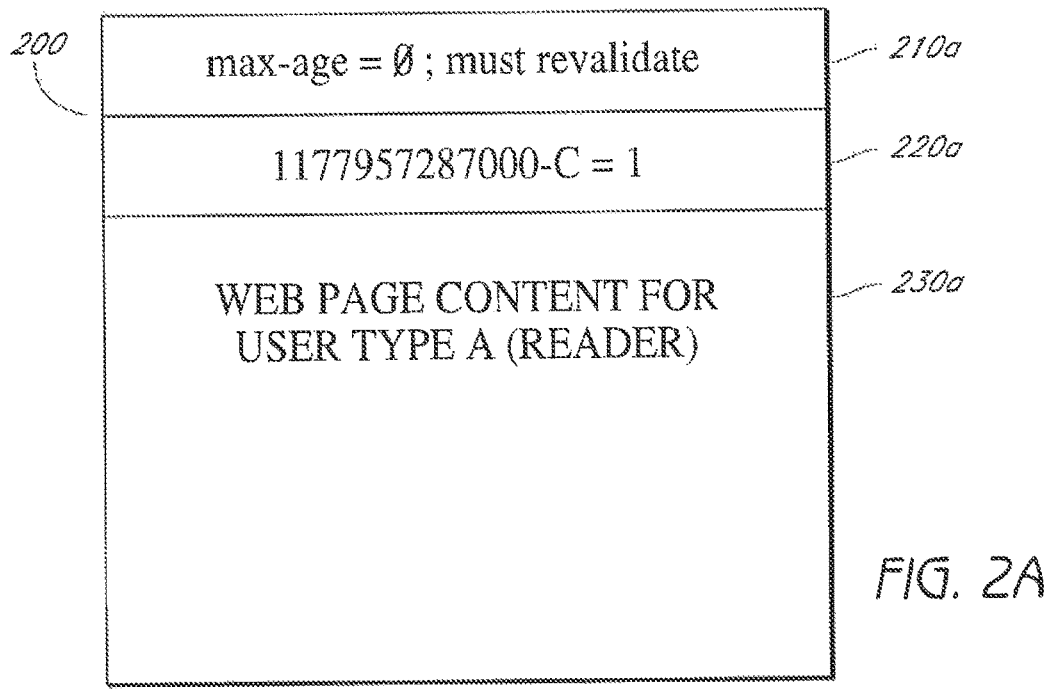
FIG. 2A depicts one embodiment of a web page format for web pages served to a first type of user.
Figure 2B:
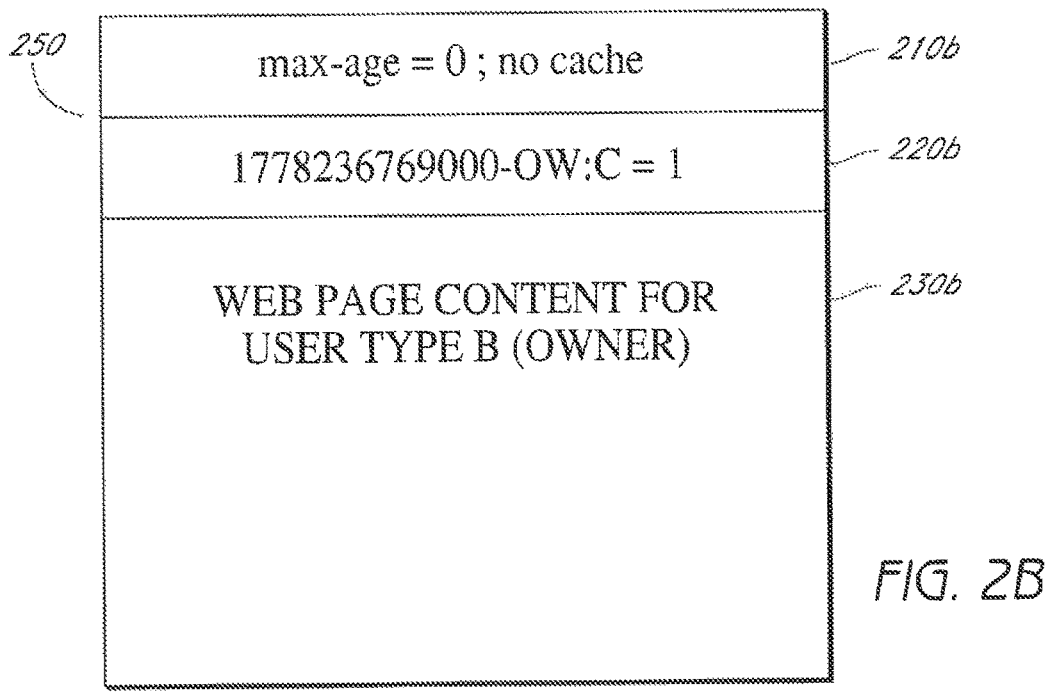
FIG. 2B depicts one embodiment of a web page format for web pages served to a second type of user.

FIGS. 2A and 2B depict embodiments of web page formats 200, 250 for web pages served to different user types 110, 120 in accordance with the systems and methods disclosed herein. In particular, FIGS. 2A and 2B depict embodiments of web page formats 200, 250 for use in conjunction with the sample embodiment depicted in FIG. 1. FIG. 2A depicts one embodiment of a web page format 200 for a web page to be viewed by a reader 120, and FIG. 2B depicts one embodiment of a web page format 250 for a web page to be viewed by an owner 110.

Both of the web page formats 200, 250 include one or more control headers 210a, 210b that provide instructions to the shared caching server 140 for processing the web pages. Some shared caching servers 140 can use an "age" header on a cached object to determine how long the cached object is to be considered "fresh" and suitable for serving to requestors. The sample control headers 210a, 210b in FIGS. 2A and 2B include a "max-age=0" header that indicates to the shared caching server 140 that there is no length of time for which the web page can be guaranteed to be valid. With this header, the shared caching server 140 is thereby instructed to check the validity of the cached web page upon each request for the page. The depicted sample control header 210a for the reader page further includes instructions that the cached web page is to be re-validated by the origin server 150 upon each user request and before providing the cached web page to the user 110, 120. The sample control header 210b for the owner page depicted in FIG. 2B further instructs the shared caching server 140 that the web page should not be cached.

In other embodiments, other control headers may additionally or alternatively be used with the web page formats 200, 250, or other web page formats, such as to allow for the inclusion of multiple shared caching servers 140 in the system 100 and/or for other types of caches or servers. For example, a "proxy-revalidate" control header and/or a "Pragma: no-cache" control header may be used. Other control headers may additionally or alternatively be used for other reasons, such as to accommodate compatibility with earlier versions of caching protocols.

More information on cache-control headers that may be used with embodiments of the systems and methods described herein can be found online at: http://www.w3.org/Protocols/rfc2616/rfc2616-sec14.html#sec14.9.

Both of the example web page formats 200, 250 include an ETag 220a, 220b, which is a type of revalidation header. In various embodiments, the content of the ETag 220a, 220b is unique for each version of the web page and also depends, at least in part, on one or more user types for whom the web page is intended. For example, in various embodiments, the web page may be one that is served for most readers, or the owner, the moderator, and so forth.

The ETags 220a, 220b depicted in FIGS. 2A and 2B include a beginning numerical portion on the left-hand side that can be a coded time-stamp, frequently expressed in milliseconds, for indicating a time at which the web page was last modified. The time-stamp in the ETag 220*a*, 220*b* sent by the shared caching server 140 can be used by the ETag-based decision module 170 to compare with a time-stamp on the current version of the web page in the origin server 150 in order to determine if the cached web page is a current version of the requested web page.

The ETags 220*a*, 220*b* depicted in FIGS. 2A and 2B, which are suitable, for example, for blog web pages, also include an indication, at the right-hand side, of a number of comments that are included in the version of the web page associated with the ETag. The indication, which may be referred to herein as a comment-counter, may be encoded, for example, as "C=x" where "x" is equal to the number of comments in the web page. The ETags 220*a*, 220*b* in FIGS. 2A and 2B indicate that the version of the sample web page has one comment. Information about the number of comments in the web page may be used as another way to use the ETag 220*a*, 220*b* to compare the currency of a cached web page with the current version of the web page as stored in the origin server 150.

In addition to the time-stamp and the comment-counter, the ETag 220*b* for an owner web page may also include a user-type-indicator, which in FIG. 2B is depicted as the character string "ow:" interposed between the time-stamp and the comment-counter. The lack of the character string "ow:" in the ETag 220*a* for the reader web format 200 can indicate that the page is not intended for serving to an owner 110. Thus, embodiments of the ETag 220*a*, 220*b* include user-type identification information in addition to information that allows for comparison with a current version of the web page.

The web page formats 200, 250 in FIGS. 2A and 2B further include web page content 230*a*, 230*b* that may be personalized for the type of user. For example, as previously described, the web page content 230*b* for an owner page may include edit controls or other features not provided to readers 120 accessing the web page. It is recognized that a variety of web page formats may be used.

As will be understood by practitioners of ordinary skill in the art in light of the present disclosure, in other embodiments, other methods may additionally or alternatively be used to differentiate between a page that needs to be refreshed and one that can be served as cached using one or more ETags or other validation headers. As one example, cookie headers can be used as validation headers. In at least one embodiment, the shared caching server 140 appends the validation information described herein with reference to Etags in the form of a cookie for the validation request. The validation information may include, for example, user type, version information, date of last update, or the like.

In some embodiments, the shared caching server 140 is configured to cache web pages that have time set to 0, and also include an ETag 220*a*, 220*b* and other cache headers 210*a*, 210*b*. The caching server therefore caches the received web page, and does not serve it up to a user 110, 120 without revalidating the web server. When the caching server 140 receives another request for the web page, the caching server 140 tries to validate the web page by sending the ETag and a Conditional GET request to the origin server 150. If the Conditional GET request is for the same version of the web page that is currently cached (and, using the current example, if the user-type is reader 120), the ETags are the same. The origin server 150 may indicate that the web page versions are the same and may not return any content, in which case the shared caching server 140 serves the version from the cache 145 to the requester. Otherwise, if the ETag 220*a*, 220*b* and other validation request information indicate that the cached page is not the current version and/or that the user type for the request is one that always gets a new version of the web page (such as the "owner" type in our example), the origin server 150 returns a new version of the requested web page to the shared caching server 140. In some embodiments, appropriate headers can be set so that the shared cached server 140 caches a reader-version web page and does not cache an owner-version web page.

While the use of ETags with respect to caching systems has been known for validating the "freshness" of cached data, the inclusion of user type information within the ETag allows the systems and methods disclosed herein to use existing caching and serving infrastructure to reduce load on an origin server 150 that serves dynamic content to a plurality of user types.

Operation

Figure 3:
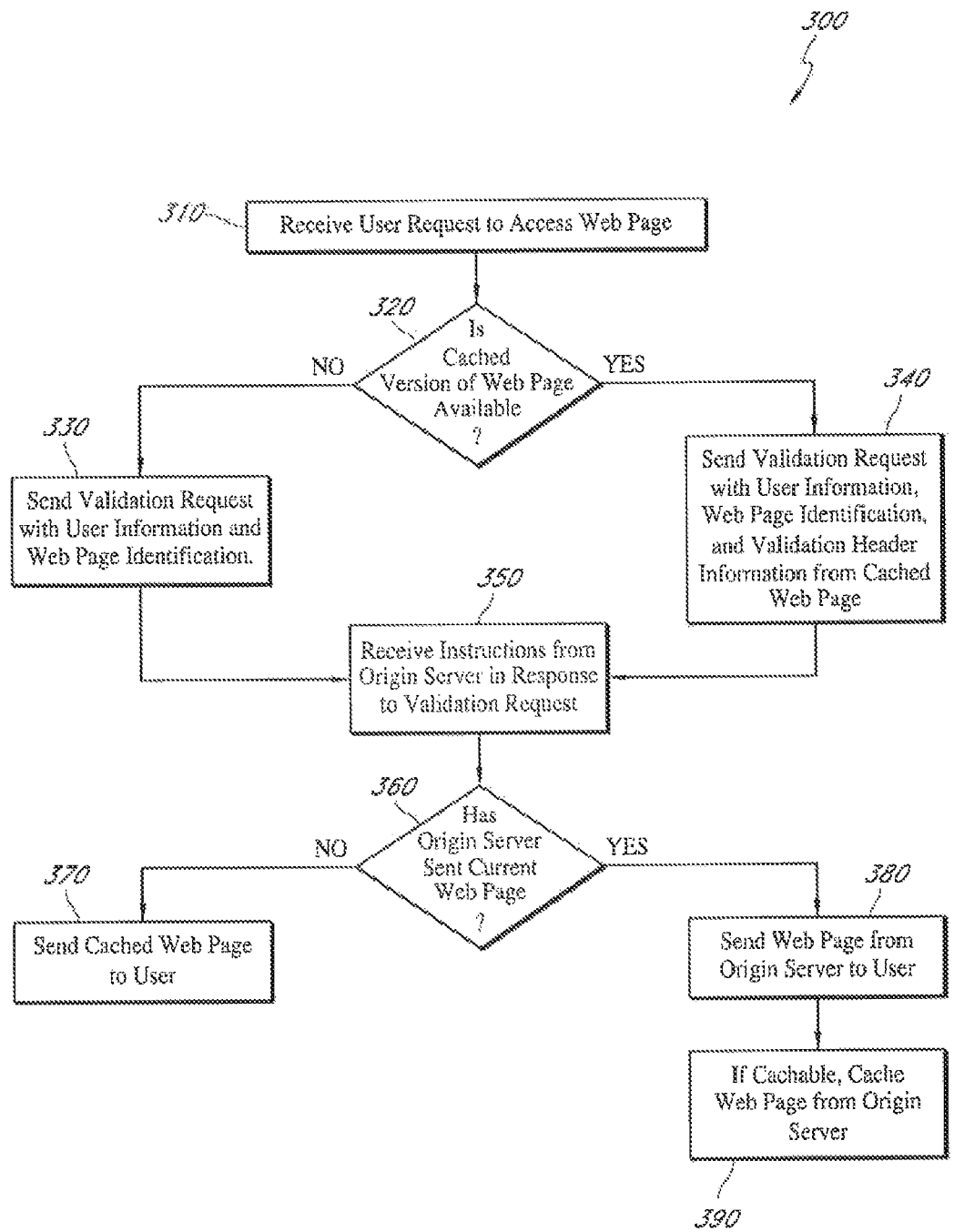
FIG. 3 is a flowchart that depicts one embodiment of a process for serving content by a shared caching server.

FIG. 3 is a flowchart that depicts one embodiment of a process 300 for serving content by a shared caching server 140. The process 300 begins in state 310, in which the shared caching server 140 receives a user request to access a web page. In various embodiments, the user request may include information about a desired web page and information indicative of a user who is requesting the web page.

In state 320, the shared caching server 140 determines if a cached version of the requested web page is available in the repository of cached web pages 145. Once the shared caching server 140 determines if a cached version of the requested web page is available, the shared caching server 140 sends a validation request to the origin server 150.

If no cached version of the requested web page is available, the validation request includes information about the requested web page and information about the user, as indicated in state 330. If a cached version of the requested web page is available, as indicated in state 340, the shared caching server 140 sends a validation request that includes ETag information from the cached version of the web page, as well as information about the user making the request. In some embodiments, additional information about the requested web page is included in the validation request. In other embodiments, the information about the requested web page is included in the ETag information.

From state 330 or state 340, the process 300 continues to state 350, where the shared caching server receives instructions from the origin server 150 in response to the validation request. In particular, as depicted in state 360, the shared caching server 140 determines if the origin server 150 has sent an updated version of the web page in response to the request.

If the origin server 150 has not sent an updated version of the web page in response to the request, then the cached web page identified by the shared caching server is appropriate for the user type of the requestor and is an up-to-date version of the page. In state 370, the shared caching server can serve the web page to the requesting user.

Alternatively, if the origin server 150 has sent an updated version of the web page in response to the request, then the cached web page identified by the shared caching server 140, if any, is not appropriate for the user type of the requester and/or is not an up-to-date version of the page. In state 370, the shared caching server can serve the modified web page to the requesting user. Furthermore, as depicted in state 390, if the modified web page received by the shared caching server 140 is cacheable, the shared caching server 140 may store the modified web page in the repository of cached web pages 145 for use with respect to future user requests.

Figure 4:
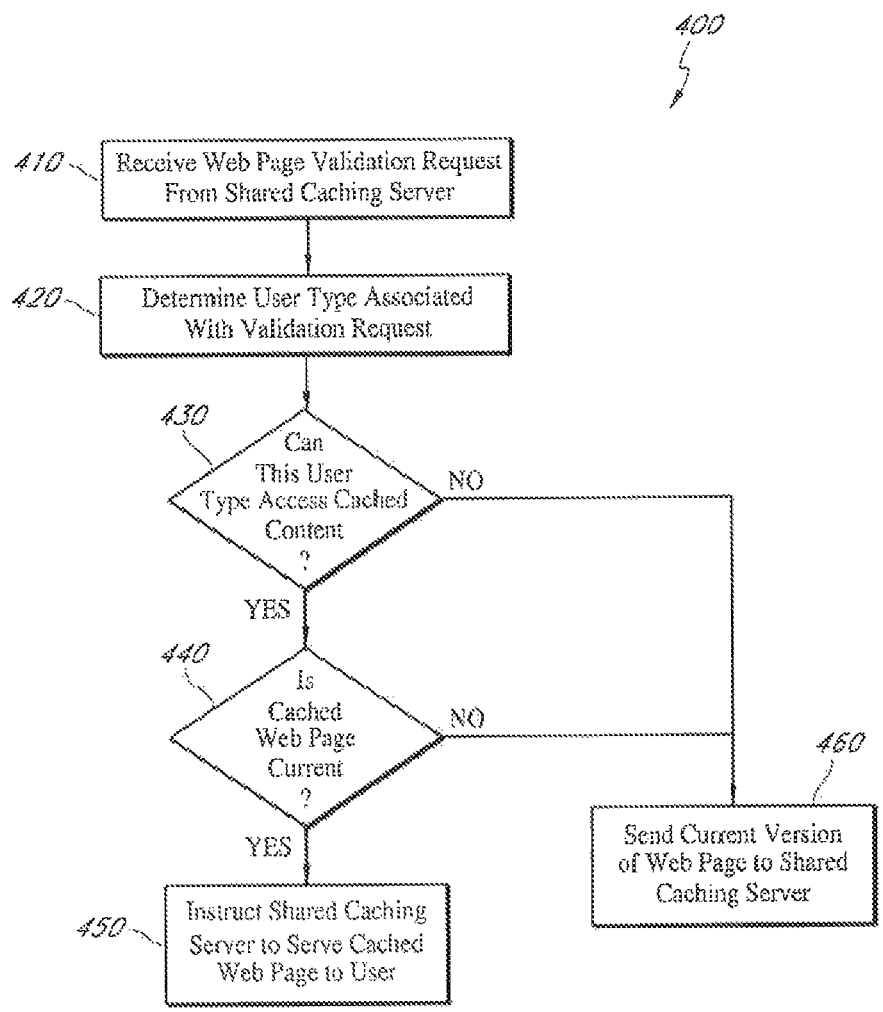
FIG. 4 is a flowchart that depicts one embodiment of a process for directing a shared caching server to serve content.

FIG. 4 is a flowchart that depicts one embodiment of a process 400 for directing the shared caching server 140 to serve content.

Beginning in state 410, the origin server 150 receives a web page validation request from the shared caching server 140. The validation request includes, among other types of information, information that is indicative or that can be used by the origin server 150, in state 420, to ascertain the user type of the user who is requesting the web page. For example, the validation request may include a name or identifier associated with the user, which the requester identification module 160 of the origin server 150 may use to access stored information about the user type associated with the user. Additionally or alternatively, the validation request itself may include information about the requester's user type, either with or without additional information about the identity of the requester.

In state 430, the ETag-based decision module 170 determines, based on the requester's user type identified in state 420 and on the ETag user type information, whether the cached web page is appropriate for the requester.

If the cached web page is appropriate for the requester, in state 440, the ETag-based decision module 170 further determines, again based on the ETag information, whether the cached web page is a current version. For example, as described with reference to FIGS. 2A and 2B, ETag timestamp information, ETag comment-counter information and/or other types of information included in the ETag may be used to determine the currency of the cached web page.

If, in state 440, the ETag-based decision module 170 determines that the cached web page is a current version, then in state 450, the origin server 150 can instruct the shared caching server 150 to serve the cached web page to the requesting user.

If, in state 430, the origin server 150 determines that the cached web page is not appropriate for the requestor's user type, or, if, in state 440, the ETag-based decision module 170 determines that the cached web page is not a current version, then the process 400 moves to state 460, in which the origin server 150 sends a current version of the web page, with an appropriately updated ETag, to the shared caching server 140. By sending the current version of the web page, the origin server 150 indicates to the shared caching server 140 that the previously cached web page is not appropriate for serving to this requester.

As will be familiar to practitioners of ordinary skill in the art in light of the present disclosure, other embodiments of the processes 300, 400 described in FIGS. 3 and 4 may be carried out by executing the functions described in FIGS. 6A and/or 6B in a different order, by dividing the functions in another manner, and/or by including some or all of the functions described above in conjunction with other associated functions.

System

Figure 5:
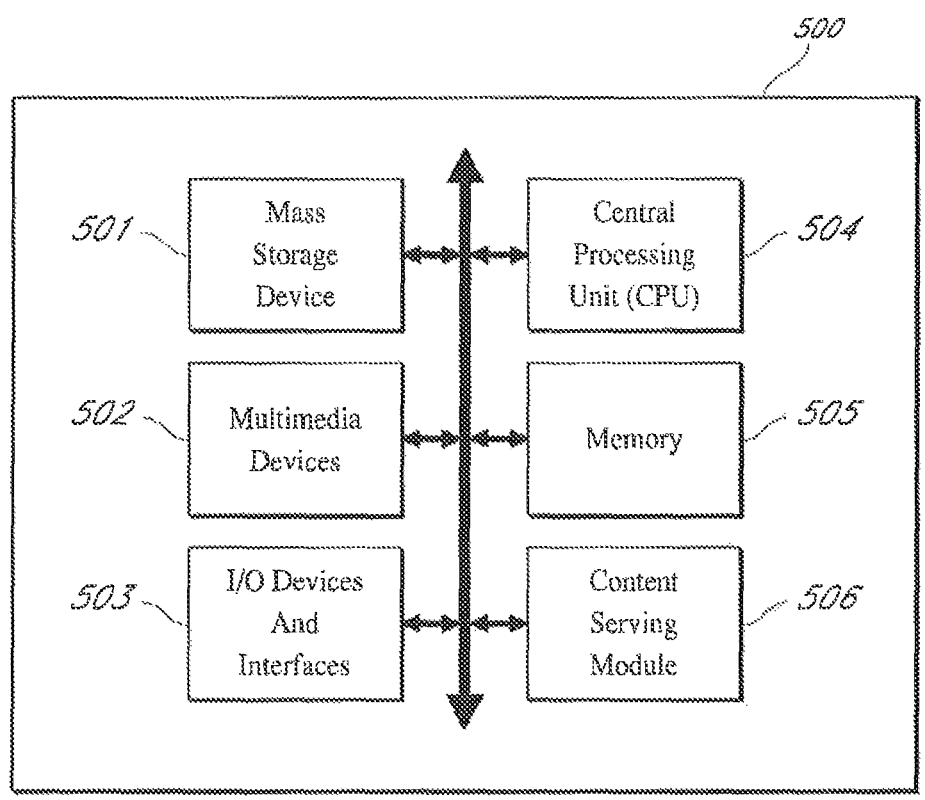

FIG. 5 is a block diagram depicting one embodiment of a computer server system 500 configured to run software for implementing one or more embodiments of the systems and methods for dynamic serving of content described herein. The shared caching server 140 and/or the origin server 150 may be implemented using one or more physical machines, as described with reference to FIG. 5, and the functions described with respect to the shared caching server 140 and/or the origin server 150 may be implemented using one or more software components. The computer server system(s) 500 may include a central processing unit (CPU) 504, which may include one or more conventional microprocessors. The computer server system(s) 500 may further include a memory 505, such as random access memory ("RAM") for temporary storage of information and a read only memory ("ROM") for permanent storage of information, and a mass storage device 501, such as a hard drive, diskette, or optical media storage device.

The computer server system(s) 500 may include one or more commonly available input/output (I/O) devices and interfaces 503, such as a keyboard, mouse, touchpad, microphone, and printer. Thus, in one embodiment, the computer server system(s) 500 may be controlled using the keyboard and mouse input devices, while in another embodiment, the user may provide voice commands to the computing device via a microphone. In one embodiment, the I/O devices and interfaces 503 include one or more display devices, such as a monitor, that allows the visual presentation of data to a user, such as a system administrator. More particularly, a display device provides for the presentation of GUIs, application software data, and multimedia presentations, for example. The computer server system(s) 500 may also include one or more multimedia devices 502, such as speakers, video cards, graphics accelerators, and microphones, for example.

In one embodiment, the I/O devices and interfaces 503 provide a communication interface to various external devices. For example, the computer server system(s) 500 may be configured to communicate with one or more networks, such as any combination of one or more LANs, WANs, or the Internet, for example, via a wired, wireless, or combination of wired and wireless, communication links. The network communicates with various computing device, including user computing devices and/or other electronic devices via wired or wireless communication links. In one embodiment, the user computing devices may be IBM, Macintosh, and/or Linux/Unix compatible. In various embodiments, the user computing devices may comprise one or more servers, laptop computers, cell phones, Blackberry devices, personal digital assistants, kiosks, or audio players, for example.

The computer server system(s) 500 may further comprise a content serving module 506 that manages the functions for serving and caching of dynamic content for access by users of two or more different user types. When the computer system 500 is an origin server 150, an embodiment of which is described with reference to FIG. 1, the content serving module 506 may store and/or carry out, among other functions disclosed herein, an embodiment of the process 400 for directing the shared caching server 140 to serve content, as described with reference to FIG. 4. When the computer system 500 is a shared caching server 140, an embodiment of which is described with reference to FIG. 1, the content serving module 506 may store and/or carry out, among other functions disclosed herein, an embodiment of the process 300 for serving content, as described with reference to FIG. 3.

Typically, modules of the computer server system(s) 500 are electronically connected using a standards based bus system. In different embodiments, the standards based bus system could be Peripheral Component Interconnect (PCI), Microchannel, SCSI, Industrial Standard Architecture (ISA) and Extended ISA (EISA) architectures, for example. In certain embodiments, components of the computing device communicate via a network, such as a local area network that may be secured.

The shared caching server 140 and/or the origin server 150 are generally controlled and coordinated by operating system software, such as Windows 95, Windows 98, Windows NT, Windows 2000, Windows XP, Windows Vista, Linux, SunOS, Solaris, or other compatible operating systems. In Macintosh systems, the operating system may be any available operating system, such as MAC OS X. In other embodiments, the servers 140, 150 may be controlled by a proprietary operating system. Conventional operating systems control and schedule computer processes for execution, may perform memory management, provide file system, networking, and I/O services, and may provide an interface, such as a graphical user interface ("GUI"), among other things.

In various embodiments, the systems and methods for caching and serving dynamic content may be embodied in part or in whole in software that is running on one or more computer server systems 500. The functionality provided for in the components and modules of the computer server system(s) may comprise one or more components and/or modules.

In general, the word "module," "application", or "engine," as used herein, refers to logic embodied in hardware and/or firmware, and/or to a collection of software instructions, possibly having entry and exit points, written in a scripting or programming language, such as, for example, PHP, Python, .NET (DotNet), ASP, Java, Ruby, Ruby on Rails, Lua, C and/or C++. These may be compiled and linked into an executable program, installed in a dynamic link library, or may be written in an interpreted programming language such as, for example, BASIC, Perl, or Python. It will be appreciated that modules, applications, and engines may be callable from others and/or from themselves, and/or may be invoked in response to detected events or interrupts. Instructions may be embedded in firmware, such as an EPROM.

It will be further appreciated that hardware may be comprised of connected logic units, such as gates and flip-flops, and/or may be comprised of programmable units, such as programmable gate arrays or processors. The modules, applications, and engines described herein are in certain applications preferably implemented as software modules, but may be represented in hardware or firmware in other implementations. Generally, the modules, applications, and engines described herein refer to logical modules that may be combined with other modules and/or divided into sub-modules despite their physical organization or storage.

In some embodiments, the computer server system(s) 500 may communicate with one or more databases that store information, including user information, dynamic content storage information, and the like. This database or databases may be implemented using a relational database, such as SQLite, Sybase, Oracle, CodeBase, mySQL, and Microsoft® SQL Server as well as other types of databases such as, for example, a flat file database, an entity-relationship database, and object-oriented database, and/or a record-based database.

Additional Embodiments

Although the foregoing invention has been described in terms of certain embodiments, other embodiments will be apparent to those of ordinary skill in the art from the disclosure herein. Moreover, the described embodiments have been presented by way of example only, and are not intended to limit the scope of the inventions. Indeed, the novel methods and systems described herein may be embodied in a variety of other forms without departing from the spirit thereof. Accordingly, other combinations, omissions, substitutions and modifications will be apparent to the skilled artisan in view of the disclosure herein. Thus, the present invention is not intended to be limited by the preferred embodiments. Furthermore, for purposes of discussing the invention, certain aspects, advantages and novel features of the invention have been described herein. Of course, it is to be understood that not necessarily all such aspects, advantages or features will be embodied in any particular embodiment of the invention.

For example, in some embodiments, web pages for owners 110, as well as web pages for readers 120 are cached in the shared caching server 140. When a request from a user 110, 120 is received by the shared caching server 140, the shared caching server 140 uses a look-up table or other locator information to determine if any versions of the web page are stored in the cache of stored web pages 145. The shared caching server 140 may send a validation request that includes ETags 220*a*, 220*b* from any web pages identified, possibly including web pages for different user types, as well as user information. The requestor identification module 160 determines the user type, and the ETag-based decision module 170 determines (a) whether any of the ETags received from the shared caching server 140 correspond to the user type, and (b) if so, if the ETag corresponds a current version of the web page for that user type. The origin server 150 can then respond to the shared caching server 140 with instructions as to which of the cached pages, if any, to send to the user, or with instructions that include a modified web page for sending to the user and for storing in the cache of stored web pages 145 as a current web page for that type of user.

As another example, in some embodiments, the requestor identification module 160, described as being part of the origin server 150, may additionally or alternatively be configured to reside in the shared caching server 140. The shared caching server 140 may therefore be able to determine a requestor's user type and may configure and/or send the validation request accordingly.

Additionally, although the content being served has been described herein as being web pages, in other embodiments, other types of content may additionally or alternatively be served using the disclosed systems and methods.

What is claimed is:

1. A method of serving web content, the method comprising the following operations performed by one or more processors:

receiving, from a client, a request for content;

sending a validation request to an origin server, the validation request including at least information indicating whether the client is associated with at least one of a plurality of different user types and cache-control header information, wherein the cache-control header information identifies a cached version of the requested content and includes a coded time-stamp, a comment counter, and a user-type indicator;

accessing, based on the validation request, stored information in a database that is associated with the at least one of the plurality of different user types;

determining, based on the stored information, whether the client is associated with a first user type or a second user type; and receiving a validation response from the origin server if the client is associated with at least one of the first and second user types.

2. The method of claim 1, further comprising:
providing, to the client, at least one of the requested content and the cached version of the requested content based on the validation response.

3. The method of claim 1, wherein:
the first user type comprises users with ownership rights to the requested content; and
the second user type comprises users without ownership rights to the requested content.

4. The method of claim 1, wherein the requested content comprises content associated with a web page.

5. The method of claim 1, further comprising:
storing the requested content as a current version of the requested content in a memory device in response to receiving an instruction to provide the current version of the requested content to the client.

6. The method of claim 1, wherein:
the first user type comprises users without ownership rights to the requested content; and
the second user type comprises users with ownership rights to the requested content.

7. A method of serving web content, the method comprising the following operations performed by one or more processors:
receiving, from a cache server, a validation request including at least information indicating whether a client requesting content is associated with at least one of a plurality of different user types and cache-control header information, wherein the cache-control header information identifies a cached version of the requested content and includes a coded time-stamp, a comment counter, and a user-type indicator;
accessing, based on the validation request, stored information in a database that is associated with the at least one of the plurality of different user types;
determining, based on the stored information, whether the client is associated with a first user type or a second user type; and
generating a validation response if the client is associated with at least one of the first and second user types.

8. The method of claim 7, further comprising:
transmitting the validation response to the cache server.

9. The method of claim 7, wherein the requested content comprises content associated with a web page.

10. The method of claim 7, wherein the first user type and the second user type are each associated with different ownership policies for accessing cached content.

11. The method of claim 10, wherein the different ownership policies comprise at least an owner policy and a general reader policy.

12. The method of claim 11, wherein the owner policy differs from the general reader policy in that the owner policy comprises edit controls that allow an owner user to edit or modify the content.

13. A cache server system, comprising:
a processing system comprising one or more processors; and
a memory system that stores instructions, the instructions being executable by the processing system to perform operations comprising:
receiving, from a client, a request for content;
sending a validation request to an origin server, the validation request including at least information indicating whether the client is associated with at least one of a plurality of different user types and cache-control header information, wherein the cache-control header information identifies a cached version of the requested content and includes a coded time-stamp, a comment counter, and a user-type indicator;
accessing, based on the validation request, stored information in a database that is associated with the at least one of the plurality of different user types;
determining, based on the stored information, whether the client is associated with a first user type or a second user type; and
receiving a validation response from the origin server if the client is associated with at least one of the first and second user types.

14. The cache server system of claim 13, wherein the memory system further includes instructions to cause the processing system to perform additional operations, including:
providing, to the client, at least one of the requested content and the cached version of the requested content based on the validation response.

15. The cache server system of claim 13, wherein:
the first user type comprises users with ownership rights to the requested content; and
the second user type comprises users without ownership rights to the requested content.

16. The cache server system of claim 13, wherein the requested content comprises content associated with a web page.

17. The cache server system of claim 13, wherein the memory system further includes instructions for causing the cache server system to perform additional operations, including:
storing the requested content as a current version of the requested content in the memory system in response to receiving an instruction to provide the current version of the requested content to the client.

18. The cache server system of claim 13, wherein:
the first user type comprises users without ownership rights to the requested content; and
the second user type comprises users with ownership rights to the requested content.

* * * * *